July 19, 1938.     E. H. LAND     2,123,901
LIGHT POLARIZING MATERIAL
Filed April 3, 1936
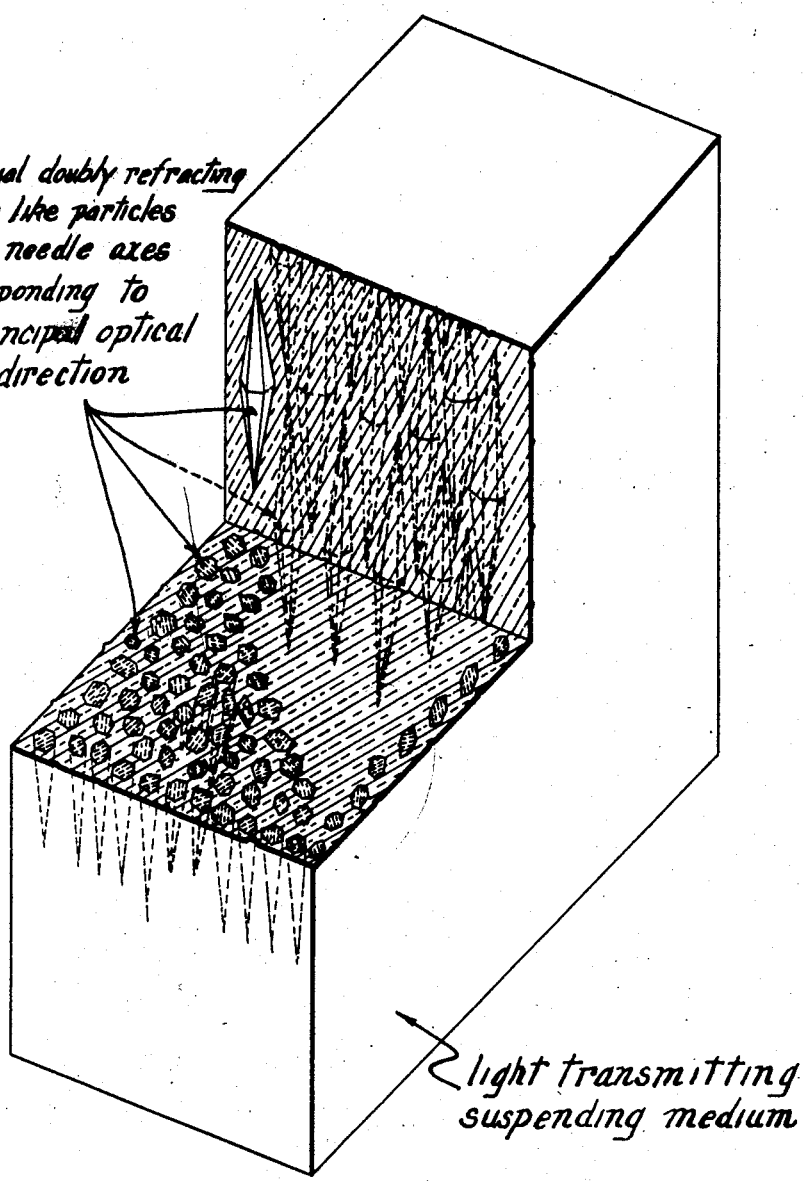
INVENTOR
Edwin H. Land
BY
Brown & Jones
his ATTORNEYS Patented July 19, 1938

2,123,901

UNITED STATES PATENT OFFICE 2,123,901

LIGHT POLARIZING MATERIAL

Edwin H. Land, Wellesley Farms, Mass., assignor to Sheet Polarizer Company, Inc., Union City, N. J., a corporation of New Jersey Application April 3, 1936, Serial No. 72,501

6 Claims. (Cl. 88—1)

This invention relates to a new and improved polarizing material.

An object of the invention is to provide a light polarizing material adapted to resolve a beam of ordinary light into two components emerging from said material as polarized beams with their planes of polarization at substantially right angles to each other, one of said beams emerging as a diffused beam, the other of said beams emerging as either a non-diffused beam or as a beam differently diffused.

A further object of the invention is to provide a polarizing material of the character described which will transmit an incident beam without substantial loss.

Still further objects of the invention are to provide a light polarizing material of the character described comprising a light-transmitting suspending medium having dispersed and embedded therein a mass of doubly refracting particles; to provide such a suspension in which the same principal optical direction of all of said particles is oriented to substantial parallelism; to provide as the suspended particles needle-like, uniaxial or biaxial crystals having an axis of rotation (crystallographic symmetry axis) coinciding with the needle axis; and to provide such a quantity of dispersed doubly refracting particles within the suspension as to insure substantial diffusion of at least one of the transmitted components of an incident beam.

A still further object of the invention is to provide a polarizing material of the character described which will function in the manner described for oblique as well as normal angles of incidence, and to this end a preferred object of the invention is to provide a suspension of uniaxial, doubly refracting crystals within a light-transmitting suspending medium, the axes of rotation of said crystals being oriented to substantial parallelism and the index of refraction of the suspending medium matching the index of the crystals for the ordinary ray.

Another object of the invention is to provide such a suspension of uniaxial crystals wherein the index of refraction of the suspending medium matches the index of the crystals for the extraordinary ray.

Still another object of the invention is to provide such a suspension of biaxial, doubly refracting crystals wherein the index of refraction of the suspending medium equals the index for the component of the transmitted beam which vibrates parallel to the needle axis of the suspended crystals.

Still another object of the invention is to provide, in a polarizing material of the character described, suspended particles of such a shape that the direction of diffusion of the differently diffused components of a transmitted beam may be controlled.

A still further object of the invention is to provide a light polarizing material which is substantially homogeneous as to refractivity for polarized light of a given wave length and substantially heterogeneous as to refractivity for a differently polarized light of the same wave length.

Other objects of the invention will in part be obvious and will in part appear hereinafter.

The invention accordingly comprises an article of manufacture possessing the features, properties and the relation of elements which will be exemplified in the article hereinafter described and the scope of the application of which will be indicated in the claims.

For a fuller understanding of the nature and objects of the invention, reference should be had to the following detailed description taken in connection with the accompanying drawing, which represents diagrammatically and in greatly enlarged scale a perspective view in section of a portion of a sheet of light polarizing material embodying a preferred form of the invention.

It has heretofore been suggested that a sheet-like polarizing material may be formed by dispersing a mass of light polarizing needle-shaped particles in a suspending medium, by then orienting the particles by subjecting the medium to flow, or to pouring, or to extrusion, or to rolling, or to stretch, or by subjecting the particles within the medium to the action of an electric or magnetic field of force or combinations thereof, and then setting the medium to hold the particles in oriented relation. Such a polarizing body is disclosed for example in U. S. Patent No. 1,918,848 to Land and Friedman and in my issued United States Patent No. 2,078,254, patented April 27, 1937.

Light polarizing materials such as are disclosed in the said patents function, when placed in the path of a beam of ordinary light, to plane polarize the beam transmitted by the polarizer by resolving the beam into two components and by differentially absorbing the said components. If polarizers of the type described in the said patents are to function efficiently, one of the components must be substantially completely absorbed, while the other component, the desired component, is at least partially absorbed.

Furthermore, polarizers such as are disclosed in the said patents function primarily because of the polarizing action of the individual suspended particles upon the transmitted beam. Providing the suspending medium is light-transmittent, the operation of the polarizer is substantially independent of the index of refraction of that medium. The suspended particles function not because of any correspondence between their indices of refraction and that of the suspending medium, but rather because of their ability as individual particles to differentially absorb the components of a transmitted beam of ordinary light.

The polarizer of the present invention comprises also a suspending medium having dispersed and embedded therein a mass of oriented particles, preferably of needle-shape and preferably with the needle axes oriented. It functions to polarize the transmitted beam, however, in a very different manner from the polarizer described in the patents above mentioned. The polarizer of the present invention functions to transmit substantially all of one component of the incident beam while utilizing a very high percentage of the other component as well. It may function to transmit one of the components as a highly diffused beam having a predetermined plane of polarization and to transmit the other component as a substantially non-diffused or specular beam having a plane of polarization at right angles to that of the first component.

The polarizer of the present invention functions primarily because of the correspondence between the index of refraction of the suspending medium with one of the indices of the suspended particles and the difference between the index of the medium and the other index of the suspended particles.

The suspending medium of the present invention is deliberately selected not only to be transparent but to have an index of refraction which coincides with the index of the suspended particles for one component of the transmitted beam. It follows, since the suspended particles are doubly refracting, that the index of refraction of the suspending medium differs from the index of refraction of the suspended particles for the other component of the transmitted beam.

The polarizer of the present invention is highly useful in many cases, especially where a loss in the effective intensity of the light source is to be avoided, for the polarizer of the present invention transmits one component of the incident beam with substantially no loss and transmits the other component with but little loss.

The polarizer of the present invention is particularly adapted for use in connection with the elimination of headlight glare from automobiles. Any diminution in the effective intensity of the headlight beam is to be avoided, if possible. If the polarizer of the present invention is employed as a polarizing screen adjacent the headlight of a motor vehicle, it may be so designed as to transmit as a specular, non-diffused component, one of the two transmitted components of the incident beam. This component may be employed as the beam directed far down the road in advance of the vehicle, and this component may be polarized in any predetermined plane. The polarizer in the application described would transmit the other component of the incident beam as a highly diffused component which might be employed, for example, to light the road immediately in front of the vehicle and to the sides thereof, and which component would be polarized in a plane at right angles to the specularly transmitted component. If the driver of an approaching vehicle were equipped with a polarizer such as is described in U. S. Patent No. 1,918,848, or in United States Patent No. 2,078,254, that polarizer or viewing visor could be so positioned as to block the specularly transmitted component from the headlight, so that the driver of the approaching car would see only the diffused non-glaring component. Furthermore, if the polarizer of the present invention is so designed as to cause all portions of the incident beam to impinge upon a large number of the doubly refracting particles as the beam traverses the polarizer, then the component of the beam which becomes diffused may, under certain circumstances, emerge as a substantially depolarized beam, or it may, under other circumstances, emerge as a polarized beam, but with its plane of polarization rotated until it substantially coincides with that of the specularly transmitted component. These results may be obtained by controlling the shape and the number of the suspended particles interposed in the path of the incident beam. A polarizing viewing visor may, under these circumstances, function to block not only the specularly transmitted component, but a part at least of the other component, as well.

It may, under certain circumstances, be desirable to provide a viewing visor so positioned as to block the diffusedly projected component of the polarizer of this invention while transmitting the specularly projected component. For example, where a polarizer embodying the present invention is employed as a window screen, an observer would ordinarily be unable to see objects through the screen because of the presence of the diffused component. If the observer were provided with a viewing visor positioned to block the diffused component and to transmit the specularly projected component, he could then see through the polarizer acting as a shade or window screen as though it were of substantially clear glass.

It will furthermore be understood that combinations of the polarizing material embodying the present invention with the polarizing material heretofore described in Patent No. 1,918,848 may be employed to alter effectively the degree of diffusion of a transmitted beam. Rotation of one such polarizer with respect to the other may change the beam from one which is substantially completely diffused to one which is substantially non-diffused. Combinations of elements comprising the polarizing material of this invention may be employed to change the transmitted beam, for example, from one which is half specularly transmitted and half diffusedly transmitted to one which is completely diffused.

The suspended particles employed in connection with the polarizer of the present invention may be either uniaxial or biaxial. Where uniaxial particles are employed it is desirable that they be oriented so that their optic axes are substantially parallel within the suspending medium. In the great majority of cases the optic axis of a uniaxial crystal coincides with its needle axis if the crystal has a needle axis. If uniaxial crystals of this type are employed, i. e., needle-shaped crystals wherein the optic axis coincides with the needle axis, the crystals may be oriented within the suspending medium by introducing the crystals into the medium while the medium is plastic and by then subjecting the medium and the suspended needle-like crystals to a mechanical stress, such for example as by flowing the medium or pouring it, or rolling it, or extruding it through an orifice, or stretching it. In fact, any of the known methods of orienting asymmetric suspended particles within a medium may be employed, and when employed result in a substantial orientation of the needle axes and hence the axes of rotation of the suspended particles. The medium may then be hardened or set to hold the suspended particles in oriented relation.

This type of orientation is to be preferred, and hence a preferred form of the suspended particles is one in which the particles are needle-like and have their axes of rotation coinciding with their needle axes. It is to be understood, however, that symmetrical particles or particles in which the axis of rotation does not coincide with any needle axis may be employed provided the particles are responsive to an impressed electric or magnetic field of force, so that under the influence of such a field their axes of rotation tend to orient in substantial parallelism. When such a method of orientation is employed the suspension should be kept within the influence of the field until it has hardened sufficiently to hold the particles from movement within the suspending medium.

Where doubly refracting uniaxial crystals or particles are employed in the polarizer of the present invention, a suspending medium may be employed which has an index of refraction substantially equal to the index of refraction of the suspended particles for the component vibrating either parallel with the axis of rotation or at right angles to the axis of rotation.

When the incident beam impinges upon the surface of the polarizing body of the present invention normal thereto, and when the axes of rotation of the suspended particles lie parallel to the surface of the polarizing body itself, the polarizer functions to resolve one component into a diffused beam and to transmit the other component as a specularly transmitted, non-diffused beam. If the index of refraction of the suspending medium coincides with the index of refraction of the particles for vibrations parallel to the needle axes of the particles, then that component of the incident beam which vibrates parallel to the needle axes of the particles will be transmitted as a non-diffused component, while the other component vibrating at right angles to the needle axes of the crystals will be transmitted as a diffused component. Under these circumstances, if the polarizer is rotated with respect to the incident beam about an axis at right angles to the needle axes of the suspended particles, the beam which has been described as specularly transmitted becomes more and more diffused until the diffusion of this component approaches that of the other component as a limit. It follows that for effective operation of the polarizing body where the index of refraction of the suspending medium matches the index of refraction for the component vibrating parallel to the needle axes of the suspended particles, the polarizer should be employed only in connection with a beam impinging upon its surface normally thereto.

Where the suspending medium is selected to have an index of refraction coinciding with the index of refraction of the suspended uniaxial doubly refracting particles for vibrations at right angles to the needle axes thereof (index for the ordinary ray), and where the needle axes of the particles lie parallel to the surface of the polarizing element and are oriented in substantial parallelism, then the polarizing element will transmit a beam impinging upon its surface normal thereto with the component vibrating at right angles to the needle axes of the particles (ordinary ray) as a specularly transmitted non-diffused component, the other component (extraordinary ray) being transmitted as a diffused component. If, under these circumstances, the polarizing body is rotated about an axis at right angles to the needle axes of the suspended particles so that the beam no longer falls normally upon the surface of the polarizing body, the component whose vibrations are perpendicular to the vibrations of the ordinary ray (sometimes called the $\epsilon'$ ray) becomes less and less diffused, tending to approach as a limit the specular transmission of the other component. Under these circumstances, adequate diffusion of the component vibrating parallel with the needle axes may be accomplished even though the incident beam is not normal to the surface of the polarizing body, by increasing the concentration of the suspended particles within the sheet or thickness of the sheet and hence the number of particles interposed in the path of the beam.

In either of the cases described, i. e., where the index of refraction of the suspending medium matches either the index of the particles for vibrations parallel to the needle axes or at right angles thereto, rotation of the polarizing body about an axis parallel to the needle axes of the suspended particles effects no change in the characteristics of the diffused and specularly transmitted components.

It will be apparent from the preceding discussion that a preferred embodiment of the invention and one adapted for use even where the incident beam is not normal to the surface of the polarizing element is one in which the suspending medium possesses an index of refraction coinciding with the index of the suspended particles for vibrations at right angles to the needle axes of those particles.

Such an embodiment of the invention is shown in the accompanying drawing, which is intended to represent a set suspending medium of light-transmitting material having dispersed and embedded therein a multitude of uniaxial, doubly refracting needle-like crystals with their needle axes oriented to substantial parallelism and substantially parallel to the surface of the polarizing element, the index of refraction of the suspending medium being substantially the same as the index of the suspended particles for vibrations at right angles to the needle axes thereof.

It is to be understood that uniaxial crystals of any of the standard types may be employed, i. e., they may have a three-fold, four-fold or six-fold axis of rotation, and they may be either tetragonal, hexagonal, or trigonal. The higher index of refraction of the crystals may coincide with the needle axis or be at right angles thereto. A preferred crystal is one in which there is a substantial difference between the two indices of refraction and in which the index of refraction for vibrations at right angles to the needle axis coincides with that of one of the preferred suspending media herein referred to.

Where biaxial, anisotropic crystals are employed in the polarizer of the present invention, a preferred form is one wherein the particles are of needle shape with the needle axis corresponding to a principal optical direction. In orthorhombic crystals the needle axis, if any, ordinarily coincides with one of the three principal optical directions. In monoclinic crystals the needle axis may correspond to the two-fold axis of rotation, and does so in perhaps half the cases. In triclinic crystals the needle axis corresponds to a principal optical direction only rarely. Where the crystals are to be oriented within the suspending medium by orientation of the needle axes of the crystals, crystals should be selected in which the needle axis corresponds to a principal optical direction.

Biaxial crystals of the type described may be employed to advantage in a polarizing body embodying this invention where the incident beam is normal to the surface of the polarizer. If the suspending medium is selected to have an index of refraction equal to the index of the suspended biaxial crystals for the component of the transmitted beam vibrating parallel to the needle axis of the suspended crystals, such a structure will probably function satisfactorily even should the polarizing body be rotated about an axis parallel to the needle axes of the suspended particles.

While the suspended particles have been spoken of as uniaxial or biaxial, it is to be understood that there are some biaxial crystals which are substantially uniaxial, and these crystals will function substantially in the manner described in connection with the description of uniaxial crystals.

The suspending medium selected should be light-transmitting and should not react with the suspended particles. It should preferably be singly refractive and should be selected to have an index of refraction coinciding with the index of the particles suspended for the desired component of the transmitted beam. Suitable suspending media may be cellulosic materials, such for example as cellulose acetate or cellulose nitrate, synthetic resins, such for example as vinyl acetate, with an index of refraction of 1.466, or the material sold under the trade name "Sirax" with an index of refraction of 1.81, or the material sold under the trade name "Hyrax" with indices varying from approximately 1.80 to 1.71, or the material sold under the trade name "Aroclor 4465," with an index of refraction of 1.665, or the material sold under the trade name "Santalite MPH," with an index of refraction of 1.590, or the material sold under the trade name "Rezyl 14," with an index of refraction of 1.572, or other synthetic resins, resins and light-transmitting gums, such for example, as Canada balsam, with an index of refraction of 1.54, glass and other similar media. It is to be understood that ingredients may be incorporated with the basic suspending medium to alter its index of refraction within reasonable limits so that a close conformity to the desired index of the suspended crystalline particles may be secured. Various of the media already specified may be mixed together to give an index of refraction for the suspending medium within the range of the upper and lower limits of the indices of the mixed media. For example, a suspending medium having any desired index between 1.80 and 1.54 may be formed from mixtures of Hyrax and Aroclor, or Aroclor and Canada balsam.

It should also be understood that under certain circumstances, and where a particularly high refractive index is to be desired, the materials now in common use for petrographic work, such as the vitreous transparent media of the character of the sulphur selenium mixtures, or mixtures of piperine with various iodides, may be employed. Such mixtures may give indices ranging from 1.68 to 2.10, and may be used under certain conditions where it is desirable to match the upper index of the associated crystals.

In the preparation of the suspension comprising the polarizer of this invention, solvents or plasticizers for the suspending media may be employed, provided, however, that they are not solvents for the suspended crystalline particles. A preferred composition is one in which the index of refraction of the suspending medium has been modified to conform accurately to the desired index of the suspended particles and in which the suspending medium has then been dissolved or plasticized by the addition of a volatile solvent which does not react with the crystalline particles incorporated into the suspension. The suspending media heretofore mentioned as suitable for the invention have been selected because of their inertness, their ease of handling, and because they possess indices of refraction which are within the range of the more desirable crystalline particles to be employed and which by well known methods may be altered to approximately conform to the desired index of the particles.

Examples of suitable uniaxial crystals for use in the polarizer of the present invention are mercuric cyanide having an index of refraction for the ordinary ray of 1.645 and having an index for the extraordinary ray of 1.492; urea, having an index for the ordinary ray of 1.484 and for the extraordinary ray of 1.602; 4-iodoantipyrine, having an index for the ordinary ray of 1.646 and for the extraordinary ray of 1.478; 4-bromoantipyrine, having an index for the ordinary ray of 1.581 and for the extraordinary ray of 1.493; and calciumphenolate, having an index of 1.650 for the ordinary ray and 1.528 for the extraordinary ray.

Examples of suitable biaxial crystals which are substantially uniaxial are aragonite, having principal indices of refraction of 1.528, 1.681 and 1.685 with the first index corresponding to the needle axis of the crystal. Related substances having substantially the same properties are strontianite and witherite. Another substance falling within the same class is dicyandiamide, having indices of 1.521, 1.549, and 1.847. Still another is potassium nitrate, having indices of 1.332, 1.506 and 1.506. Another is s-triphenylbenzol, having indices of 1.524, 1.867 and 1.874. Throughout the specification and claims the use of the phrase "substantially uniaxial" as applied to crystals shall be understood as meaning biaxial crystals wherein two principal indices of refraction so closely approximate each other that the crystal operates in the polarizer of the invention substantially as though it were uniaxial.

Examples of biaxial crystals which may be employed and which are not substantially uniaxial are p-dinitrotoluol, having indices of 1.479, 1.669 and 1.734; potassium picrate, having indices of 1.527, 1.903 and 1.952; ammonium picrate, having indices of 1.508, 1.872 and 1.908; and hydrocarbostyril, having indices of 1.479, 1.710 and 1.810.

It is to be understood further that the examples given of suitable suspended particles are not to be deemed exclusive, but that a polarizer embodying the features of this invention may be produced with other well known crystalline particles having suitable indices of refraction and by the synthesis of new crystals. It is also to be understood that the suspending media previously described are not to be deemed exclusive of other satisfactory media.

In operation a polarizer embodying the present invention and comprising, for example, a suspension of uniaxial crystals in a medium having an index of refraction equal to the index of the crystals for the component vibrating at right angles to the needle axis of the crystals and in which the crystals are oriented with their needle axes parallel, functions to resolve an incident beam into two components, one vibrating along the needle axis of the crystals, the other at right angles to the needle axis. The component vibrating at right angles to the needle axis passes through the suspension without reflection at the surfaces formed between the crystals and the suspending medium because of the similarity between the indices of refraction of the medium and the crystals. This component traverses the medium and the suspended crystals as a specular, non-diffused component and emerges as a beam of plane polarized light which is substantially specular and non-diffused. The polarizing body may be said to be homogeneous to plane polarized light vibrating in a direction parallel to the plane of vibration of this component.

The component of the incident beam vibrating parallel to the needle axes of the suspended particles is reflected in part at least at each surface between the suspending medium and the suspended particles. If enough suspended particles are employed to insure repeated reflections of each portion of this component, the portion, when it emerges from the polarizing body, will be highly diffused and, depending upon the number and character of the reflections, may either be plane polarized or to a great extent depolarized or elliptically polarized. Its plane of polarization may have a predetermined direction. The polarizer of the present invention may be said to be heterogeneous to plane polarized light vibrating in a plane perpendicular to the plane of polarization of the specularly transmitted portion of the beam.

An example of a polarizing body of the type embodying the present invention may be a suspension of small needle-shaped crystals of potassium nitrate in a mixture of cellulose acetate, dimethylphthalate and the material sold commercially as "Santalite", acetone being employed as the solvent. Cellulose acetate has an index of refraction of 1.49, dimethylphthlate 1.51 and "Santalite" 1.59. These materials, when properly mixed give a suspending medium, which is substantially plastic and which may have an index of refraction of 1.505+, which substantially coincides with the index of potassium nitrate for the ray which is perpendicular to the needle axis. The formula for determining the index of refraction of the mixture of the materials mentioned may approximate the following: $nV = n_1V_1$ plus $n_2V_2$ plus $n_3V_3$ where $n$ is the refractive index and $V$ the volume of the mixture, and $n_1$ the refractive index and $V_1$ the volume of cellulose acetate, $n_2V_2$ the refractive index and volume respectively of dimethyl phthalate, and $n_3V_3$ the refractive index and volume respectively of Santalite. The materials mentioned are readily miscible when heated. The crystals of potassium nitrate may be of such size as to be clearly visible in a standard low-powered microscope.

An example of a highly bi-refringent crystal, which may be suitably employed in a polarizer of the invention is p-azoxyanisole, whose indices are 1.564, 1.572 and 2.198.

Where ordinary crystals are employed, i. e., where crystals are not especially selected as to shape, the diffused component may be scattered in all directions vertically, as well as horizontally. It is possible, however, to control the direction of diffusion of this component. If, for example, rod-shaped, long, slender crystals are selected having relatively little surface not parallel to the axis of elongation, then the diffused component will be horizontally scattered but not vertically scattered if the polarizing body is positioned so that the needle axes of the suspended particles are vertical. It may thus be possible, by careful selection of the suspended particles, to produce a polarizing body in which one component is specularly transmitted without diffusion and in which the other component is diffusedly transmitted but in which the direction of diffusion is sharply controlled.

Where, throughout the specification, reference has been made to the needle axis of the suspended particles, it is to be understood that the particles employed are intended to be of that group wherein the needle axis corresponds to a principal optical direction.

Throughout this specification the term "optical symmetry axis" is used synonymously with "principal optical direction," i. e., one of the axes of the triaxial refractive index ellipsoid.

It should furthermore be understood that one feature of the invention herein described resides in the fact that polarizers embodying the invention may be made to function in the desired manner throughout a wide band of wave lengths, as for example throughout the visible spectrum, or the infra red, or the ultra voilet, or even by the proper selection of materials, through all such wave lengths simultaneously. Such control may be effected by selecting materials with indices of refraction matching throughout the desired wave length band.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

Having described my invention, what I claim as new and desire to secure by Letters Patent is:

1. A light-polarizer comprising, in combination, a light-transmitting medium having distributed therethrough crystals of potassium nitrate oriented with the same optical-symmetry axes in substantial parallelism, the index of refraction of the medium being substantially equal to the index of refraction of the crystals for light vibrations parallel to an oriented optical-symmetry axis thereof.

2. A light-polarizer comprising, in combination, a light-transmitting medium having distributed therethrough crystals of potassium nitrate oriented with the same optical-symmetry axes in substantial parallelism, the index of refraction of the medium being substantially equal to the index of refraction of the crystals for the ordinary ray.

3. A light-polarizing material comprising, in combination, a light-transmitting medium of cellulosic material having distributed therethrough crystals of potassium nitrate, one of the same principal optical-symmetry axes of said crystals being oriented to substantial parallelism, the index of refraction of the medium being substantially equal to the higher index of refraction of potassium nitrate.

4. A light-polarizer comprising, in combination, a light-transmitting medium having distrbuted therethrough biaxial, birefringent particles oriented with the same optical-symmetry axis of said particles in substantial parallelism, the index of refraction of the medium being substantially equal to the index of refraction of the particles for light vibrations parallel to the said axis.

5. A light-polarizer comprising, in combination, a light-transmitting medium having distributed therethrough biaxial, birefringent particles of needle shape, the particles being oriented with their needle axes in substantial parallelism and having the same optical-symmetry axis parallel to the needle axis, the index of refraction of the medium being substantially equal to the index of refraction of the particles for light vibrations parallel to the needle axis.

6. A material of the character described comprising a plurality of layers of birefringent particles distributed throughout a light-transmitting suspending medium, the particles of one layer overlying interstices between the particles of another layer, the particles being oriented with the same optical symmetry axes of the particles in substantial parallelism, the index of refraction of the medium being substantially equal to the index of refraction of the particles for light vibrating in a predetermined direction, and the index of refraction of the medium being substantially different from the index of refraction of the particles for light vibrating in a direction at right angles to said predetermined direction.

EDWIN H. LAND.